UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, OF LONG ISLAND CITY, NEW YORK, A CORPORATION OF NEW JERSEY.

ORGANIC-MANGANESE-COMPOUND DEPOLARIZER.

1,269,913.  Specification of Letters Patent.  Patented June 18, 1918.

No Drawing.  Application filed October 18, 1915. Serial No. 56,449.

*To all whom it may concern:*

Be it known that I, CARLETON ELLIS, a citizen of the United States, and a resident of Montclair, in the county of Essex and State of New Jersey, have invented certain new and useful Improvements in Organic-Manganese - Compound Depolarizers, of which the following is a specification.

This invention relates to depolarizing material intended particularly for use in galvanic cells of the Leclanché type, especially dry batteries and miniature cells of a portable character in which compactness is a great desideratum.

The invention relates to organic compounds of a higher oxid of manganese and in particular manganese dioxid and relates especially to complexes formed by the union of a hydroxy compound such as glycerin with manganese dioxid in the presence of an alkali, yielding the alkali salt of manganiglycerid. Such compounds may be used as depolarizers or from them may be formed metallic salts such as the copper or zinc salt or preferably the manganous salt of the mangani-glycerid radical. For example, manganese dioxid, either natural or artificial may be digested with glycerin and caustic soda to form the sodium mangani-glycerid and this compound reacted on with manganese chlorid giving the corresponding manganous compound of mangani-glycerid.

In place of glycerin, other organic bodies capable of reacting in a similar manner may be employed, including various glycerin derivatives and also in some cases carbohydrates such as cane sugar, glucose, starch, dextrin and so forth.

The composition may be used as a depolarizer by mixing with graphite and the like and usually compressing about a rod or pencil of carbon to form the depolarizing electrode which is placed in a zinc container containing ammonium chlorid or other similar exciting liquid.

The method of manufacture of the compound may be applied to convert mineral (natural) manganese dioxid into a hydrated form which may be done by reacting on it with glycerin and alkali and subsequently neutralizing with an acid to liberate the hydrated product which may be separated from the glycerin and further oxidized if desired.

Sodium diglycerol manganite having the formula $Na_2Mn(C_3H_5O_3)_2$ may be prepared by heating manganese dioxid preferably freshly precipitated with glycerin and caustic soda for some time, the reaction being slower with natural ore than with freshly precipitated material.

The product is a bright scarlet red when moist turning to a pale yellow when dried. When heated to 175° it decomposes. It is soluble in a mixture of alcohol and glycerin and only slightly soluble in alcohol.

*Reactions.*

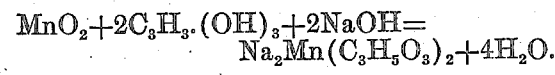

To form manganese salt digest for some time with manganese sulfate.

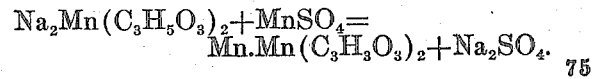

The copper and zinc salts are formed in same manner by digesting with the sulfates of these metals.

What I claim is:—

1. The process of making an artificial oxid of manganese adapted for use as a depolarizing agent which comprises reacting on natural manganese dioxid with glycerin in the presence of an alkali and in decomposing the product of reaction; whereby hydrated manganese dioxid is obtained.

2. The process of making an artificial oxid of manganese adapted for use as a depolarizing agent which comprises reacting on manganese dioxid with glycerin in the presence of an alkali and in decomposing the product of reaction; whereby hydrated manganese dioxid is obtained.

3. The process of making an artificial oxid of manganese adapted for use as a depolarizing agent which comprises reacting on manganese dioxid with a reactive organic hydroxy body of substantially a carbohydrate nature in the presence of an alkali and in decomposing the product of reaction; whereby hydrated manganese dioxid is obtained.

4. The process of making an artificial oxid of manganese of a character adapted for use as a depolarizing agent in dry batteries of the Leclanché type which comprises reacting on low grade manganese dioxid with an organic agent to form a compound thereof and in subsequently decomposing the product of reaction; whereby a hydrated manganese dioxid product is obtained.

CARLETON ELLIS.